United States Patent [19]
Moore et al.

[11] 3,956,231
[45] May 11, 1976

[54] FLAME AND SMOKE RETARDANT STYRENE POLYMER COMPOSITION

[75] Inventors: Fred W. Moore, Plymouth; Calvin J. Hallada; Henry F. Barry, both of Ann Arbor, all of Mich.

[73] Assignee: Amax Inc., New York, N.Y.

[22] Filed: Sept. 3, 1974

[21] Appl. No.: 502,719

[52] U.S. Cl. .................. 260/42.14; 260/45.7 R; 260/45.75 R; 260/45.95 G
[51] Int. Cl.² .................................................. C08J 3/20
[58] Field of Search ............. 260/45.75 R, 45.7 R, 260/45.95 G, 30.4 R, 42.14

[56] References Cited
UNITED STATES PATENTS

| | | | |
|---|---|---|---|
| 3,786,087 | 1/1974 | Conard et al. | 260/45.7 |
| 3,796,772 | 3/1974 | Luce | 260/45.7 |
| 3,825,520 | 7/1974 | Parts et al. | 260/45.75 |
| 3,845,001 | 10/1974 | Mitchell | 260/45.75 |
| 3,870,679 | 3/1975 | Mitchell et al. | 260/45.75 R |
| 3,883,482 | 5/1975 | Kroenke | 260/45.75 R |
| 3,900,441 | 8/1975 | King | 260/45.75 W |
| 3,903,028 | 9/1975 | Mitchell | 260/45.75 R |

Primary Examiner—V. P. Hoke
Attorney, Agent, or Firm—Harness, Dickey & Pierce

[57] ABSTRACT

A flame retardant styrenic synthetic polymer containing a flame retardant agent comprising a mixture of a molybdenum compound selected from the group consisting of molybdenum trioxide, ammonium dimolybdate, and ammonium heptamolybdate, in combination with a halogenated hydrocarbon compound selected from the group consisting of halogenated aromatic compounds, halogenated cyclic aliphatic compounds, and mixtures thereof.

13 Claims, No Drawings

FLAME AND SMOKE RETARDANT STYRENE POLYMER COMPOSITION

BACKGROUND OF THE INVENTION

A considerable amount of effort has been expended in recent years to develop and the technology of flame retardancy, particularly as it relates to the plastics field. A variety of compounds or combination of compounds have been found which, when incorporated in synthetic polymers, impart good flame retardant characteristics thereto through various mechanisms such as an interference with the flame reaction, by the exclusion of air or by insulating the substrate from heat, preventing further decomposition to produce additional fuel for further combustion. Of the various flame retardant agents developed, those containing antimony, halogen or phosphorus are perhaps the most widely used. While flame retardant agents comprising combinations of antimony-containing compounds and halogen-containing compounds have been found to be effective when incorporated in various plastic compositions, antimony itself is toxic and the recent rise in the cost of this material, which is available only from foreign sources, has occasioned problems not only from an economic standpoint, but also from the standpoint of the availability of the material.

The present invention overcomes many of the problems and disadvantages associated with other flame retardant compositions when incorporated in styrenic resin systems, particularly ABS resins, by providing a flame retardant agent which is more economical than antimony-containing flame retardant agents on a cost-effectiveness basis, is of comparatively low toxicity in comparison to antimony-containing agents, is available from domestic sources in good quantities and which, by careful selection of compounds and concentrations, imparts flame retardancy characteristics to styrenic plastics sufficient to pass even the most severe and stringent flammability tests.

SUMMARY OF THE INVENTION

The benefits and advantages of the present invention are achieved by providing a flame retardant synthetic resin composition comprising a styrene containing resin polymer having substantially uniformly dispersed therethrough, a flame retardant and smoke suppressant agent consisting essentially of a molybdenum compound selected from the group consisting of molybdenum trioxide, ammonium dimolybdate (ADM), ammonia heptamolybdate (AHM), as well as mixtures thereof, in combination with a halogenated hydrocarbon compound selected from the group consisting of halogenated aromatic compounds, halogenated cyclic aliphatic compounds, and mixtures thereof, of which brominated aromatics and brominated cyclic aliphatics containing from about 70% to 85% halogen are preferred. The halogen compound or mixture of halogenated compounds are possessed of sufficient thermal stability to enable their incorporation in styrenic polymers and to withstand temperatures from about 350°F up to about 450°F during milling and molding of such resin systems without undergoing undesirable decomposition and/or loss due to volatilization. The molybdenum and halogen compounds also are of a physical form enabling a substantially uniform distribution thereof throughout the plastic matrix.

Additional benefits and advantages of the present invention will become apparent upon a reading of the description of the preferred embodiments taken in conjunction with the specific examples provided.

DESCRIPTION OF THE PREFERRED EMBODIMENTS

The compositions and proportions of the constituents of the flame retardant agent as herein disclosed are described in terms of percentages by weight unless otherwise indicated.

The flame retardant agent of the present invention comprises a blend or mixture of selected molybdenum-containing compounds and halogen-containing hydrocarbon compounds present in controlled proportions so as to form volatile or gaseous molybdenum halide salts when the styrenic plastic in which they are incorporated is subjected to heat as normally encountered during combustion or exposure to direct flame during flammability testing. The term "styrenic" resin or polymer as employed herein encompasses resin systems which incorporate significant quantities of styrene such as, for example, acrylonitrilebutadiene-styrene (ABS), butadiene-styrene (BS), styreneacrylonitrile (SAN), as well as polystyrene itself.

The molybdenum compounds suitable for use in accordance with the practice of the present invention comprise molybdenum trioxide ($MoO_3$) which may vary in purity depending upon its source of manufacture and the degree of purification to which it has been subjected. Conventionally, molybdenum trioxide of a technical grade of purity, that is, one preferably containing at least about 85% of molybdenum trioxide, is satisfactory. The degree of purity is not critical since the inactive portion merely serves as an extender filler in the resin matrix. While higher purity raw materials also can be used for this purpose, the higher cost of such pure grades without any significant advantage over the technical molybdenum oxide grade normally is not justified from an economic standpoint.

Ammonium dimolybdate, or ADM, [$(NH_4)_2Mo_2O_7$], can also be satisfactorily employed as a source of the molybdenum constituent of the flame retardant agent. Ammonium heptamolybdate, or AHM, [$(NH_4)_6Mo_7O_{24}\cdot 4H_2O$], also comprises a satisfactory material and as in the case of ADM decomposes upon being subjected to elevated temperatures liberating ammonia and water leaving a residue of molybdenum oxide which thereafter undergoes a reaction with the halogens of the halogenated aromatic compounds to produce volatile molybdenum oxohalides; e.g., $MoO_2X_2$, molybdenum dioxodihalide; $MoOX_3$, molybdenum oxotrihalide; $MoOX_4$, molybdenum oxotetrahalide; or hydrogen halide adducts of $MoO_3$, i.e., $MoO_3\cdot 2HX$. The molybdenum oxohalide formed is gaseous at the temperatures normally encountered during a gas phase combustion reaction and are believed, according to one of the accepted theories, to result in a reduction in the concentration of hydroxyl and hydrogen radicals, reducing the exothermic oxidation of carbon monoxide by the hydroxyl radical and producing hydrogen halides and halogenated combustion products instead.

Regardless of the particular mechanism or theory on which the improved flame retardancy characteristics of the molybdenum-containing fire retardant agent of the present invention is predicated, it has been found that the specific molybdenum compound or mixture of molybdenum compounds, when used in an amount to provide a concentration calculated as molybdenum of from about 2% up to about 10% of the total flame retardant styrene-containing polymer composition in combination with controlled amounts of the halogenated compound, produce particularly satisfactory flame retardant and smoke suppressant compositions. Quantities of the molybdenum compounds to provide a concentration of molybdenum in excess of about 10% can also be employed but are generally undesirable from an economic standpoint, particularly in view of the excellent flame retardancy characteristics of styrenic plastic compositions employing the flame retardant agent at concentrations of about 10% and below.

The molybdenum constituents are present in a finely-particulated powdered state and while particle size is not particularly critical, it is generally desirable to employ particles of a size and configuration so as to optimize total surface area, rendering the molybdenum compounds available for reaction and to further facilitate their uniform dispersibility throughout the styrenic plastic matrix. For example, the molybdenum trioxide material in the form of a commercially available technical oxide product is of an average size usually less than about 20 mesh (U.S. Standard Screen Size). Generally it is preferred to employ materials of a finer average particle size such as less than about 10 microns.

It is also contemplated that the molybdenum compounds can be present in an extended form; that is, in the form of a coating on a particulated extender material which may itself be possessed of flame retardant characteristics. The use of such extender materials provides cost savings over the use of particles comprised entirely of the molybdenum compounds in that it is the surface of the particle which undergoes reaction during a gaseous combustion of the polymer matrix with the reaction seldom progressing to the extent where the entire particle is consumed. Accordingly, by using an inexpensive extender particle as the core over which the reactive molybdenum compound or compounds are applied as a coating, a reduction in the quantity of molybdenum compound required for a selected degree of flame retardancy is accomplished, or alternatively, the extended molybdenum compound provides for a greater availability when used in the same amount as the nonextended material.

The particulated extender may comprise any one of a variety of substances which are compatible with the molybdenum compounds deposited thereon, as well as with the styrenic polymer matrix, and which moreover do not adversely affect the chemical and physical properties of the resultant polymer and the effectiveness of the flame retardant agent incorporated therein. In consideration of the foregoing, any one or combinations of two or more of the various filler materials normally incorporated in filled styrenic polymer compositions can be satisfactorily utilized, provided that no adverse reaction occurs between such filler material and the halogenated hydrocarbon compounds and molybdenum compounds deposited thereon.

The particular size and configuration of the extender particles may vary in consideration of the parameters previously discussed, although it is generally preferred that the particle configuration is one which will maximize the surface area and which will render the molybdenum compound deposited thereon available for reaction at such time as is required. In this regard, relatively dense particles can be employed, although particles of a somewhat porous nature can also be satisfactorily used, provided that the molybdenum compounds which become impregnated within the interstices thereof remain available for subsequent reaction. Generally, the average particle size of the particulated extender may range from about 0.1 micron up to about 25 microns and greater, although sizes of from about 0.2 micron to about 10 microns are preferred. The specific particle size of the extender material will vary within the aforementioned ranges in consideration of such additional factors as the quantity of molybdenum compound deposited thereon, the specific types and quantities of other filler materials present in the styrenic polymer matrix, the total concentration of the fire retardant agent employed, the manner and techniques by which the polymer matrix is milled and fabricated into final articles, the intended end use of the polymer matrix, and the like.

Of the broad variety of extender filler materials suitable for use as a filler in styrenic polymer systems, low-cost, so-called extender-type fillers comprising finely-divided solid powders which are uniformly dispersible throughout the resin mixture, are particularly satisfactory and include, for example, barium sulfates, calcium sulfates including gypsum, terra alba and plaster of Paris; calcium carbonate including whiting and chalk, magnesium carbonate, silicas including quartz and diatomaceous earth, magnesium silicates and related minerals such as talc and soapstone, kaolin clay, mica, pumice, alumina and hydrated aluminas, and the like. Of the foregoing, hydrated aluminas, silica and talc constitute particularly satisfactory extenders due to their low cost, availability and compatibility with styrenic polymer systems and the chemical reagents comprising the fire retardant composition.

The deposition of a coating of the ammonium dimolybdate and/or ammonium heptamolybdate compound on the surfaces of the particulated extender can conveniently be achieved by slurrying the extender in an aqueous solution containing the dissolved molybdate compound which is concentrated to form a relatively thick slurry or paste, whereafter the mixture is dried and thereafter subjected to further comminution to remove any agglomerates that may have formed during the drying phase.

The concentration and relative proportions of the extender material relative to the molybdenum compound is controlled so as to effect a deposit on the particle surfaces of the molybdenum compound of from about 1% to about 20% calculated as molybdenum, while amounts of from about 5% to about 10% are preferred for most purposes. Quantities in excess of about 20% can be satisfactorily employed, but are less desirable from an economic standpoint to extended materials containing less than about 20% of the molybdenum compound. The extended material can be employed alone or in combination with particles of the nonextended material including particulated technical molybdenum trioxide to provide the desired combination on a cost-effectiveness basis.

The halogenated hydrocarbon compounds incorporated in the styrenic polymer composition may comprise any halogenated hydrocarbon selected from the group consisting of halogenated aromatic compounds, halogenated cyclic aliphatic compounds and mixtures thereof, which are possessed of sufficient thermal stability at the temperatures at which styrenic polymers are normally processed during their preparation and final molding into finished articles or parts. Usually, such halogenated compounds should withstand temperatures generally ranging from about 350°F to about 450°F, which is typical of processing temperatures for styrenic plastics and under which conditions the halogenated compounds should not appreciably decompose or volatilize rendering them unavailable for reaction with the molybdenum constituents in the final product. While chlorinated compounds are satisfactory, particularly satisfactory results are obtained with brominated compounds and, accordingly, brominated biphenyl compounds and biphenyl oxide compounds comprise particularly satisfactory materials. Compounds of the foregoing type which are commercially available and are effective in combination with the molybdenum compounds to produce the flame retardant agent include:

hexabromobenzene

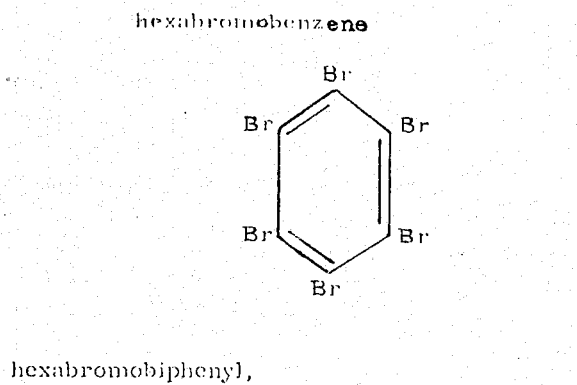

hexabromobiphenyl,

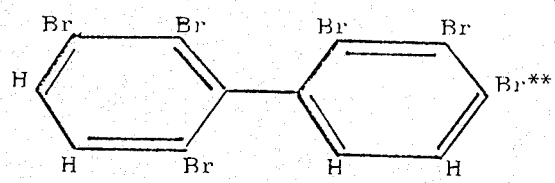

octabromobiphenyl,

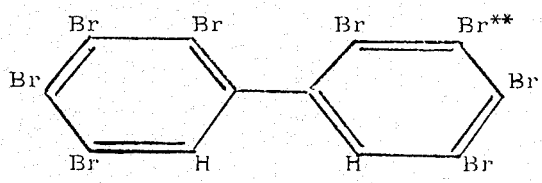

decabromodiphenyl oxide,

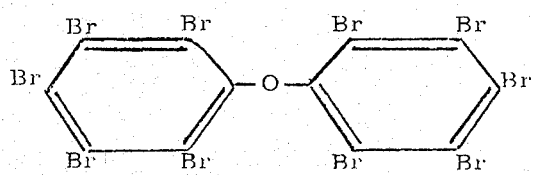

tetrabromophthalic anhydride,

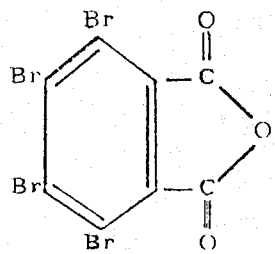

or the like.

** As well as isomers thereof.

The halogenated compounds are introduced in to the polymer matrix in the form of a finely-particulated material similar to the molybdenum compound.

The molybdenum compound, either in a pure state or in an extended state or combinations thereof, is employed in the styrenic resin matrix in amount sufficient to provide a concentration calculated as molybdenum of from about 2% up to about 10% of the total filled polymer matrix and the halogenated compound is employed in consideration of the quantity of molybdenum present so as to normally supply halogen atoms on an atomic ratio relative to molybdenum of at least equal to or greater than about 3 atoms of halogen per atom molybdenum. Preferably, the quantity of halogenated hydrocarbon is controlled so as to provide an atomic ratio of halogen-to-molybdenum of about 3.5:1 up to about 5:1. The foregoing stoichiometric ratio between the reactive constituents is not critical but a balance of the two materials provides for the best economics and most efficient usage of the two constituents.

In order to still further illustrate the fire retardant composition and its effectiveness in styrenic polymers, and particularly ABS plastics, the following typical examples are provided. It will be understood, however, that the examples are provided merely for illustrative purposes and are not intended to limit the scope of the invention as herein described and as defined by the subjoined claims.

EXAMPLE 1

An extended ammonium dimolybdate flame retardant agent is prepared by dissolving 200 grams of ammonium dimolybdate in 400 milliliters of water which is added to 800 grams of alumina trihydrate and is mixed to form a thick paste. The alumina trihydrate is designated as a commercial grade C-330, available from Aluminum Company of America, and analyzes on a weight basis: 65% - $Al_2O_3$; 0.02% - $SiO_2$; 0.025% - $Fe_2O_3$; 0.30% - $Na_2O$; 0.04% - $Na_2O$ (soluble); and 0.40% moisture. The material has a specific gravity of 2.42 and is of a particle size such that 99% passes through a 325 mesh screen (less than 44 microns), and wherein the median particle size ranges from about 6.5 to about 9.5 microns.

The paste-like mixture is stirred to assure uniformity and thereafter is dried at 80°C – 85°C accompanied by intermittent stirring. Thereafter, the dried solid is ground to a powder employing a mortar and pestle and dried at 110°C. The resultant product comprises a white powder weighing 981 grams which is passed through a Raymond Laboratory Hammer Mill two times to yield a powder with a Fisher Number of 0.98 micron having a specific gravity of 2.51. An analysis of the powder reveals that it contains 10.9% molybdenum, 1.23% ammonia, and 27.1% aluminum. This is equivalent to 19.3% ammonium dimolybdate and 78.3% alumina trihydrate, the remainder being water.

A pelletized sample of an extrusion grade ABS polymer commercially available under the trade designation "Cycolac, GSE-1000", available from the Marbon Division of Borg-Warner Corporation, is milled between two rolls heated to a temperature of 350°F. The pelletized ABS feed material fuses into a band on the milling rolls and controlled proportions of the alumina trihydrate extended ammonium dimolybdate, as previously described, are added in combination with a powdered chlorinated and brominated cyclic aliphatic compound sold under the trade designation "Dechlorane 604" by The Industrial Chemicals Division, Hooker Chemical Corporation. According to infrared analysis, the Dechlorane 604 compound comprises a complex cyclic aliphatic containing 33.4% chlorine, 43.6% bromine, 22.9% carbon and 0.4% hydrogen. The quantity of extended ammonium dimolybdate incorporated in the ABS resin is controlled to provide a molybdenum content of about 2%, which corresponds on a weight equivalent basis to about 4% ADM. The quantity of chlorinated and brominated compound is controlled to give a resin containing about 15% of the halogen compound. The addition of the extended molybdenum constitutent and the halogenated hydrocarbon compound is performed gradually during the milling operation which is continued for a prescribed time until a substantially uniform mixture is obtained.

The resultant milled plastic is stripped from the rolls and allowed to cool into a slab which is cut into sections and thereafter compression molded at about 330°F into test panels measuring approximately 6-inches by 6-inches by 1/8-inch thick, and a second series of the same size but 1/16-inch thick. Test specimens are cut from the foregoing panels and subjected to a flammability evaluation in accordance with standard test procedures in a manner subsequently to be described.

EXAMPLE 2

A flame retardant ABS resin composition is prepared in the same manner as described in Example 1 employing the alumina trihydrate extended ammonium dimolybdate compound incorporated in the same ABS plastic but employing a brominated aromatic comprising decabromodiphenyl oxide containing about 81% – 83% bromine which is in the form of a white powder having a melting point of at least about 250°C and is commercially available under the designation FR-300-BA from Dow Chemical Company. The milled composition contains 20% by weight of the extended ammonium dimolybdate material corresponding to an effective 4% of the ADM compound equivalent to about 2% molybdenum based on the total filled composition. The brominated biphenyl compound was present in an amount of 15% of the total resin mixture.

Test specimens are prepared as in the case of Example 1 and submitted to flammability tests in a manner to be described.

EXAMPLE 3

A series of test specimens is prepared in the same manner as described in Example 2, but in which the milled composition contains 15% of the alumina trihydrate extended ammonium dimolybdate (instead of 20%) and contains 15% of the brominated biphenyl compound.

EXAMPLE 4

A fourth series of test specimens is prepared in the same manner as described in Example 1, but in which ammonium dimolybdate is incorporated without being extended on alumina trihydrate. The milled composition contains 15% by weight of ammonium dimolybdate and 15% by weight of Dechlorane 604. Compression molded panels are prepared as in Example 1 and are cut into test specimens for evaluation of their flame retardancy characteristics.

EXAMPLE 5

An ABS resin composition is prepared in the same manner as described in Example 2 except that the alumina trihydrate used is not impregnated with a molybdenum compound. The milled composition contains 20% alumina trihydrate (without molybdenum) and 15% of the brominated aromatic.

A series of test specimens prepared in accordance with Examples 1 through 5 of a thickness of 1/8-inch together with a control specimen for comparative purposes comprised of the ABS resin alone without any flame retardants was subjected to an ASTM test designation: D2863-70, entitled "Standard Method of Test for Flammability of Plastics Using the Oxygen Index Method." A specimen 1/16-inch in thickness prepared in accordance with Examples 2, 3 and 5 was also subjected to the oxygen index test to evaluate the comparative effectiveness of the several flame retardant agents in the ABS plastic matrix. The aforementioned ASTM test determines the minimum concentration of oxygen in a slowly rising mixture of oxygen and nitrogen that will just support combustion. The Oxygen Index is expressed in terms of volume percent of the minimum oxygen concentration in the oxygen-nitrogen mixture and the results of these tests are set forth in Table 1.

TABLE 1

| | FLAMMABILITY OF ABS TEST SPECIMENS | | |
| | | Vertical Flammability Test UL-94 | |
| Specimen | Oxygen Index | Flaming Drip | 94VE-O Rating |
| --- | --- | --- | --- |
| Control (a) | 19.0 | Yes | Fail |
| Example 1 (a) | 24.5 | No | Pass |
| Example 2 (a) | 28.0 | No | Pass |
| 2 (b) | 28.0 | No | Pass |
| Example 3 (a) | 28.0 | No | Pass |
| 3 (b) | 28.0 | No | Pass |
| Example 4 (a) | 24.5 | No | Pass |
| Example 5 (a) | 25.0 | No | Fail |
| 5 (b) | 25.0 | No | Fail |

(a) 1/8-inch thick specimen
(b) 1/16-inch thick specimen

In general, the higher the Oxygen Index, the better the flame retardancy characteristics of the plastic composition.

In addition to the Oxygen Index Test, the foregoing test specimens were also subjected to an Underwriter's Laboratories, Inc., test for flammability of plastic materials under a test procedure designated as UL 94 comprising subjecting a test specimen oriented in a vertical position within a draft-free enclosure to a blue flame of a prescribed configuration for a period of ten seconds, whereafter the flame is removed and the duration of a continuation of any flaming of the specimen is noted. When the flaming of the specimen after the first flame application ceases, the test flame is immediately placed under the specimen again for an additional ten-second period, after which the test flame is again withdrawn and the duration of flaming and glowing noted for a second time. In addition to observing and recording the duration of flaming after test flame removal, observations are made of whether or not the specimens drip flaming particles which ignite a cotton swatch placed beneath the specimen. The results of these tests are also summarized in Table 1 and the resultant rating in accordance with classification 94VE-O are also listed in terms of fail or pass. In order to pass the 94VE-O classification, the specimens must not burn with flaming combustion for more than ten seconds after each application of the test flame; should not have a total flaming combustion time exceeding 50 seconds for the ten flame applications for each set of five specimens; not have any of the test specimens burn with flaming or glowing combustion up to the holding clamp; not have any of the series of specimens drip flaming particles that ignite the dry absorbent surgical cotton swatch located 12-inches below the test specimen; and finally, not have any specimen with glowing combustion which persists beyond thirty seconds after the second removal of the test flame. It is apparent that the test specimens prepared in accordance with Examples 1–4 passed and are classed as 94VE-O; whereas the control sample and the specimen from Example 5 devoid of molybdenum-containing flame retardant constituent did not pass the 94VE-O rating, indicating the flammability thereof in the absence of any flame retardant agent.

In addition to the above tests, the 1/8-inch specimens were tested for smoke density using a smoke densitometer instrument designated as Model NO. 95-001-03 and available from Michigan Chemical Corporation. The unit of measurement used to describe smoke density when measured by this instrument is smoke generation; smoke generation is the total light obscuration (the area under a % light attenuation vs. time curve) per gram of sample of fixed size, 10 × 10 × 3 mm. The results of these tests on the 1/8-inch specimens of Examples 1–5 are given in Table 2.

TABLE 2

SMOKE GENERATED DURING BURNING OF ABS TEST SPECIMENS

| Specimen | Smoke Generated[a] |
| --- | --- |
| Control | 60.0 |
| Example 1 | 23.4 |
| Example 2 | 19.7 |
| Example 3 | 19.5 |
| Example 4 | 28.5 |
| Example 5 | 39.7 |

[a] 100-% transmittance of light integrated over the duration of burning (in minutes per gram of sample).

It can be seen that the addition of molybdenum-containing retardants effectively decreases the amount of smoke generated during burning of ABS specimens. Accidental deaths due to poor visibility to see "Exit" signs caused by heavy smoke are of increasing concern to governmental agencies, insurance companies, firefighters and the general public.

While it will be apparent that the preferred embodiments of the invention disclosed are well calculated to fulfill the objects above stated, it will be appreciated that the invention is susceptible to modification, variation and change without departing from the spirit thereof.

What is claimed is:

1. A flame retardant synthetic resin composition comprising a body composed of a styrenic resin having dispersed therethrough a flame retardant agent comprising a molybdenum compound selected from the group consisting of molybdenum trioxide, ammonium dimolybdate, ammonium heptamolybdate and mixtures thereof and a halogenated hydrocrabon compound apart from said styrenic resin selected from the group consisting of halogenated aromatic compounds, halogenated cyclic aliphatic compounds and mixtures therof, said molybdenum compound present in an amount sufficient in combination with said halogenated compound to impart flame retardant and smoke suppressant characteristics to said composition, said halogenated compound present in an amount to provide sufficient halogen atoms for reaction with the molybdenum constituent to form volatile molybdenum oxohalide compounds.

2. The flame retardant synthetic resin composition as defined in claim 1, in which said molybdenum compound is present in an amount to provide from about 2% to about 10% molybdenum based on the total weight of said synthetic resin composition.

3. The flame retardant synthetic resin composition as defined in claim 1, in which said halogenated compound is present in an amount to provide halogen atoms relative to molybdenum atoms at an tomic ratio of at least about 3:1.

4. The flame retardant synthetic resin composition as defined in claim 1, in which said halogenated compound is present in an amount to provide halogen atoms relative to molybdenum atoms at an atomic ratio of about 3.5:1 to about 5:1.

5. The flame retardant synthetic resin composition as defined in claim 1, in which said halogenated compound contains from about 35% to about 85% bromine.

6. The flame retardant synthetic resin composition as defined in claim 1, in which said molybdenum compound is present in the form of particles distributed substantially uniformly throughout said body which are of an average particle size less than about 20 mesh.

7. The flame retardant synthetic resin composition as defined in claim 1, in which said molybdenum compound is present in the form of particles distributed throughout said body which are of an average size of less than about 10 microns.

8. The flame retardant synthetic resin composition as defined in claim 1, in which said halogenated compound comprises hexabromobiphenyl.

9. The flame retardant synthetic resin composition as defined in claim 1, in which said halogenated compound comprises decabromobiphenyl oxide.

10. The flame retardant synthetic resin composition as defined in claim 1, wherein at least a portion of said molybdenum compound is present in the form of a coating on the surfaces of an extender filler.

11. The flame retardant synthetic resin composition as defined in claim 10, in which the coated said filler contains from about 1% to about 20% molybdenum.

12. The flame retardant synthetic resin composition as defined in claim 10, in which the coated said filler contains from about 5% to about 10% molybdenum.

13. The flame retardant synthetic resin composition as defined in claim 10, in which said extender filler comprises finely-particulated hydrated alumina.

* * * * *